United States Patent
Koyama (10) Patent No.: US 7,812,908 B2
(45) Date of Patent: Oct. 12, 2010

(54) DISPLAY APPARATUS AND METHOD FOR MANUFACTURING SUBSTRATE FOR DISPLAY APPARATUS

(75) Inventor: Hitoshi Koyama, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 260 days.

(21) Appl. No.: 12/031,138

(22) Filed: Feb. 14, 2008

(65) Prior Publication Data

US 2008/0218673 A1  Sep. 11, 2008

(30) Foreign Application Priority Data

Mar. 9, 2007  (JP) ............................. 2007-060397

(51) Int. Cl.
  *G02F 1/1333*  (2006.01)
(52) U.S. Cl. .................. 349/122; 349/187; 349/138
(58) Field of Classification Search ............ None
  See application file for complete search history.

(56) References Cited

U.S. PATENT DOCUMENTS

| | | | | |
|---|---|---|---|---|
| 6,259,505 B1* | 7/2001 | Makino | ...................... | 349/153 |
| 6,795,153 B2* | 9/2004 | Suzuki | ...................... | 349/153 |
| 7,151,585 B2* | 12/2006 | Asakawa | .................... | 349/153 |
| 7,408,613 B2* | 8/2008 | Suzuki | ....................... | 349/153 |
| 2005/0088604 A1* | 4/2005 | Chung et al. | ................. | 349/153 |

FOREIGN PATENT DOCUMENTS

JP  2002-350820  12/2002

* cited by examiner

*Primary Examiner*—David Nelms
*Assistant Examiner*—Thanh-Nhan P Nguyen
(74) *Attorney, Agent, or Firm*—Oblon, Spivak, McClelland, Maier & Neustadt, L.L.P.

(57) ABSTRACT

A display apparatus includes a substrate including a display area of an approximate rectangle, and at least one film pattern which is formed over the substrate and extends to outside of the display area. A perimeter of the at least one film pattern has a shape of a smooth curved line at vicinity of at least one of corner portions of the display area.

18 Claims, 5 Drawing Sheets

Fig. 7

DISPLAY APPARATUS AND METHOD FOR MANUFACTURING SUBSTRATE FOR DISPLAY APPARATUS

BACKGROUND OF THE INVENTION

1. Field of the Invention

The present invention relates to a display apparatus, such as a liquid crystal display apparatus and an electroluminescence display apparatus, and to a method for manufacturing a substrate for the display apparatus.

2. Description of Related Art

In order to enhance the display quality of a liquid crystal display apparatus, it is important to control the applied voltage to the liquid crystal. In particular, if the gap of the liquid crystal is not uniform in the display area of a liquid crystal display panel, a difference is generated in the phase change of liquid crystal. As the result, brightness unevenness may occur in a displayed image.

For this reason, it is important to equalize the thickness of a film layer, such as a wiring film and an insulating film, in the display area of the liquid crystal display panel. These wiring film, insulating film, etc. are formed over an active matrix substrate where a switching element, such as a TFT (Thin Film Transistor), is formed.

Figure 7:
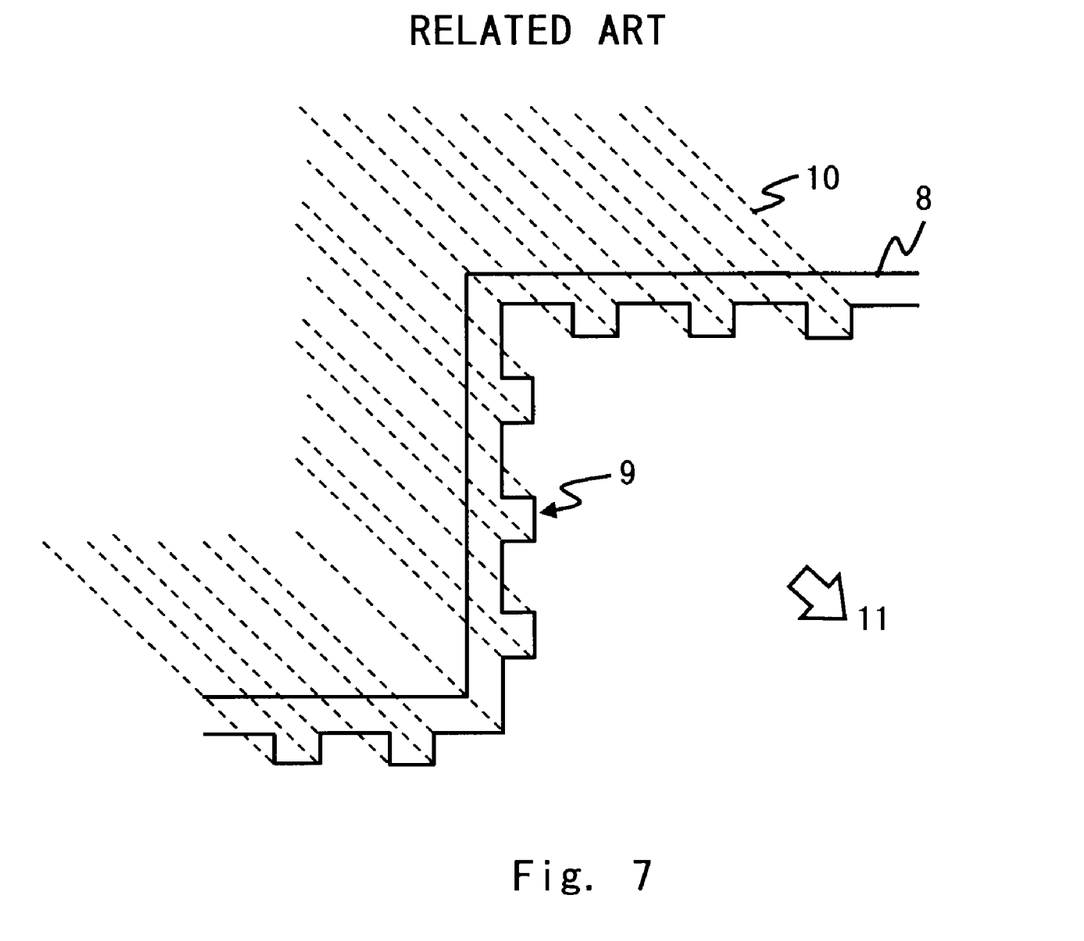
FIG. 7 is a schematic plan view showing the shape of wiring provided over the substrate for the liquid crystal display apparatus of a related art.

The liquid crystal display panel of the liquid crystal display apparatus includes the active matrix substrate described above and an opposite substrate provided opposite to the active matrix substrate. In the manufacturing process of the liquid crystal display panel of the liquid crystal display apparatus, a resin insulating film, a color filter, a resin black matrix (resin BM), and an overcoat layer are applied to the active matrix substrate, the opposite substrate, etc. Moreover, an organic film, such as resist, used for photolithography process and removed after pattern formation is also applied. When applying these, a spin coat method is used in many cases. In the conventional manufacturing process for a liquid crystal display apparatus where the spin coat method is used, the thickness of an organic film coated by the spin coat method may become uneven. Therefore, there is a problem that spatial coating unevenness occurs in the thickness of the coated organic film. This is because when the size of a wiring pattern or an insulating film pattern which is an underlying material of the organic film is large, the thickness of the organic film is affected by the shape of the pattern. Specifically, since there exists a step (level difference) of the large pattern, solution of the organic film flows along the pattern by centrifugal force at the time of spin coating. Then, the solution of the organic film, flowing along the pattern, flows outside from the corner or the end of the pattern by the centrifugal force. For this reason, after the solvent of the solution of the organic film volatilizes, large linear unevenness extending from the corner or the end of the pattern is generated, in the organic film. As to this problem, a difficulty solution example is disclosed in Japanese Patent Application Laid-open No. 2002-350820. In the liquid crystal display apparatus disclosed in Japanese Patent Application Laid-open No. 2002-350820, the shape of wiring provided on the periphery of the display area of the active matrix substrate, where a TFT element is formed, is as shown in FIG. 7. That is, a large number of small projections 9 are formed on the wiring 8. The arrow in FIG. 7 indicates a substrate center direction 11 used as a rotary shaft at the time of spin coating. Owing to the structure as shown in FIG. 7, when solution of the organic film applied by spin coating flows in the direction opposite to the substrate center direction 11 by centrifugal force, it is possible to prevent flowing along the wiring 8.

However, the flow of the solution of the organic film is prevented by the large number of small projections 9 formed on the wiring 8 serving as an underlying material in the display apparatus described in Japanese Patent Application Laid-open No. 2002-350820. For this reason, there are generated a large number of small linear coating unevennesses 10 where the thickness of the organic film is not uniform. Such coating unevenness 10 is generated starting from the corner of the projection 9, in the opposite side of the substrate center direction 11. Therefore, the problem of causing degradation of the display quality still remains. In order to enhance the display quality, it is necessary to form film layers, accumulated over the opposite substrate in addition to over the active matrix substrate, so that they may not have thickness unevenness. Specifically, it is necessary to form a color filter, a resin BM, an overcoat layer, a pillar-shaped spacer, etc. over the opposite substrate so that they may have no unevenness in thickness. However, because of the shape of other film layer (ex. color filter) serving as the underlying material, the organic film which is applied by spin coating may have coating unevenness.

Furthermore, the generation of the problem mentioned above is not limited to when forming a film layer by spin coating over the substrate for a liquid crystal display apparatus. That is, this problem also occurs when forming a film layer by spin coating in other display apparatus, such as an electroluminescence display apparatus.

SUMMARY OF THE INVENTION

The present invention has been made in view of the problem mentioned above. An object of the present invention is when forming a film pattern by spin coating over the substrate for a display apparatus to control generation of coating unevenness caused by the shape of other film pattern serving as the underlying material. Further, it is another object to provide a display apparatus with high display quality, and a method for manufacturing a substrate for the display apparatus capable of improving display quality of the display apparatus.

According to first aspect of the present invention, there is provided a display apparatus which includes a substrate including a display area of an approximate rectangle, and at least one film pattern which is formed over the substrate and extends to outside of the display area, and a perimeter of the at least one film pattern having a shape of a smooth curved line at vicinity of at least one of corner portions of the display area.

According to second aspect of the present invention, there is provided a display apparatus which includes a substrate including a display area, and at least one film pattern which is formed over the substrate and extends to outside of the display area, and whole perimeter of the at least one film pattern continues smoothly.

According to third aspect of the present invention, there is provided a method for manufacturing a substrate for a display apparatus which includes forming a first film pattern over the substrate so that it may extend to outside of an area being a display area in the substrate and a perimeter of the first film pattern may have a shape of a smooth curve at vicinity of at least one of corner portions of the display area, and coating a second film pattern over the first film pattern by spin coating.

According to the present invention, it is possible to control generation of coating unevenness caused by the shape of other film pattern serving as the underlying material when forming a film pattern by spin coating over the substrate for a display apparatus. Further, it is possible to provide a display apparatus with high display quality, and a method for manufacturing a substrate for the display apparatus capable of improving display quality of the display apparatus.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Embodiments to which the present invention can be applied will be described hereinafter. The following description is for explaining embodiments of the present invention, and the present invention is not limited to the embodiments. For the sake of brevity, the description is accordingly omitted or simplified. It is apparent that those skilled in the art may readily change, modify, or adapt the elements of the embodiments without departing from the scope of the present invention. In the drawings, elements assigned the same reference numerals indicate the same elements, and hence repetitions of their explanation are omitted accordingly.

Embodiment 1

Figure 1:
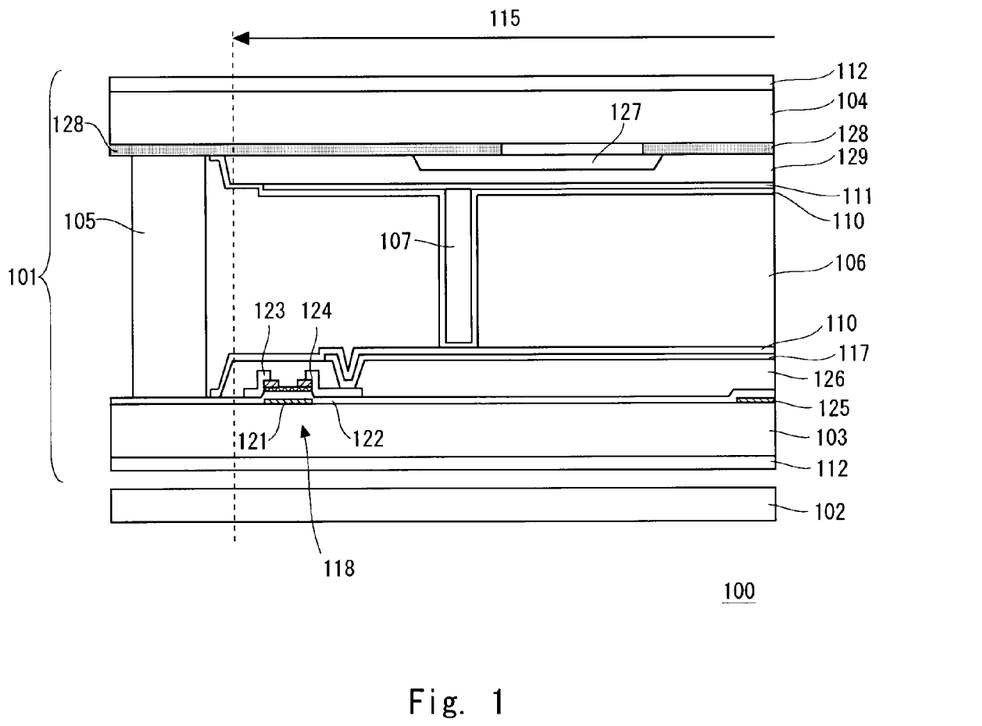
FIG. 1 is a cross sectional view showing the structure of the liquid crystal display apparatus according to a first embodiment.
Figure 2:
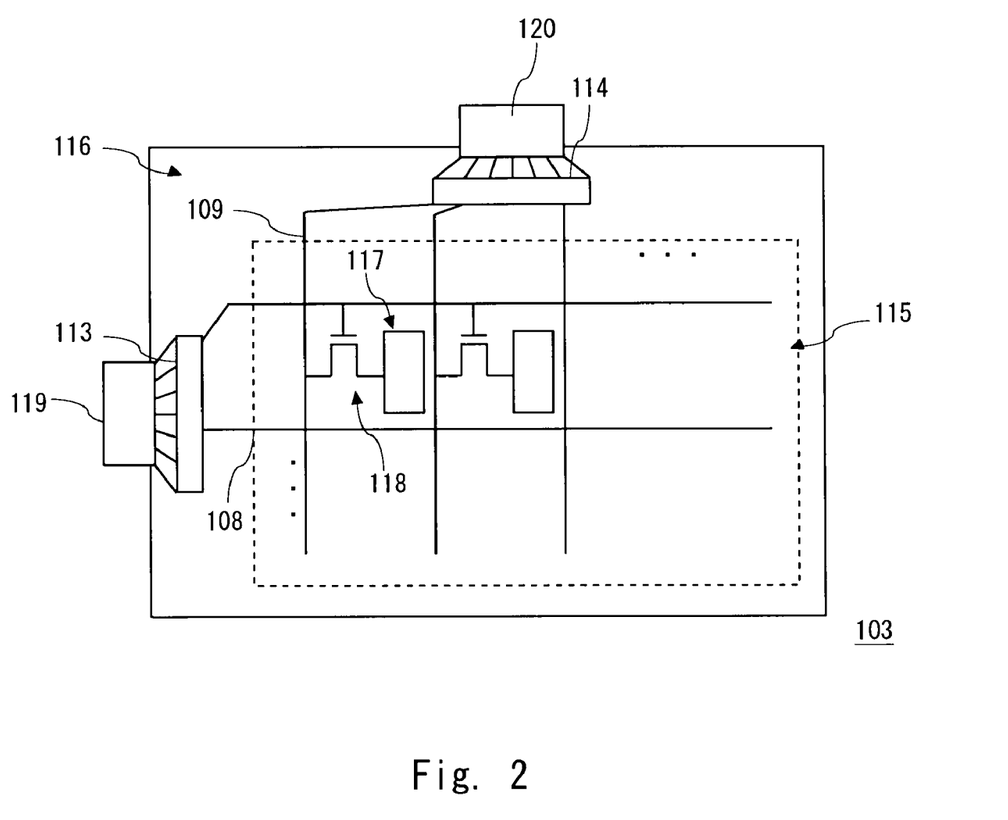
FIG. 2 is a plan view showing the structure of the liquid crystal display apparatus according to the first embodiment.

The present embodiment describes a liquid crystal display apparatus to which the present invention is applied. With reference to FIGS. 1 and 2, the structure of a liquid crystal display apparatus 100 according to the present embodiment will now be explained. FIG. 1 is a cross sectional view showing the structure of the liquid crystal display apparatus 100. FIG. 2 is a plan view showing the structure of the liquid crystal display apparatus 100.

The liquid crystal display apparatus 100 includes a liquid crystal display panel 101 and a backlight 102. The liquid crystal display panel 101 displays an image based on a display signal inputted. The backlight 102 is arranged on the invisible side of the liquid crystal display panel 101 and emits lights from the rear side of the liquid crystal display panel 101. The liquid crystal display panel 101 includes a thin film transistor array substrate (TFT array substrate) 103, an opposite substrate 104, a sealing material 105, a liquid crystal 106, a pillar-shaped spacer 107, a gate line (scanning line) 108, a source line (signal line) 109, an alignment layer 110, an opposite electrode 111, a polarization plate 112, a gate driver IC 113, and a source driver IC 114.

The TFT array substrate 103 and the opposite substrate 104 are oppositely arranged in the liquid crystal display panel 101. Both the substrates are attached by the sealing material 105. The liquid crystal 106 is enclosed in the space between both the substrates and the sealing material 105. The spacer 107 is formed between both the substrates, and a predetermined space is retained between them by the spacer 107. As the TFT array substrate 103 and the opposite substrate 104, an insulating substrate, such as made of light transmitting glass, polycarbonate, and acrylic resin, is used.

The backlight 102 is provided in the rear of the liquid crystal display panel 101. The backlight 102 emits lights from the invisible side of the liquid crystal display panel 101 to the liquid crystal display panel 101 concerned itself. To the backlight 102, for example, a general structure equipped with a light source, light guide plate, reflective sheet, diffusion sheet, prism sheet, reflective polarization sheet, etc. can be used.

As shown in FIG. 2, in the TFT array substrate 103, a display area 115 and a peripheral area 116 surrounding the display area 115 are provided. A plurality of gate lines 108 being parallel and a plurality of source lines 109 being parallel are formed in the display area 115. The gate lines and the source lines cross each other.

Moreover, a thin film transistor (TFT) 118 is provided in the vicinity of the crossing of the gate line 108 and the source line 109. A pixel electrode 117 is formed in a region surrounded by the adjoining gate line 108 and the adjoining source line 109. Thus, the region surrounded by the adjoining gate line 108 and the adjoining source line 109 serves as a pixel. On the TFT array substrate 103, pixels are arranged in a matrix manner. That is, the area where a plurality of pixels 117 are formed in a matrix manner is the display area 115.

As shown in FIG. 1, over the TFT array substrate 103, the TFT 118 and the pixel electrode 117 are formed. Then, over them, the alignment layer 110 is formed. Describing in further detail, a gate electrode 121 of the TFT 118 is connected to the gate line 108. A source electrode 123 of the TFT 118 is connected to the source line 109. A drain electrode 124 of the TFT 118 is connected to the pixel electrode 117. The pixel electrode 117 is formed of a transparent conductive thin film, such as ITO (Indium Tin Oxide). In addition, in FIG. 1, 122 denotes a gate insulating film, which is a insulating film provided between a capacity electrode 125 composing a pixel capacity and the pixel electrode 117. Moreover, 126 denotes an insulating film made of organic resin formed over the TFT 118. The insulating film 126 is formed for planarizing patterns of the TFT 118, etc.

The above-mentioned electrode, wiring, etc. formed over the TFT array substrate 103 is formed by performing photolithography processing and etching processing, for example. Specifically, first, resist is coated on the formed metal film in order to form a resist layer. The resist layer is patterned by photolithography processing to form a resist pattern. Then, etching processing is performed to the metal film by using the resist pattern as a mask, thereby forming the electrode, wiring, etc.

On the other hand, over the surface facing the TFT array substrate 103 of the opposite substrate 104, a color filter 127, a resin BM (Black Matrix) 128, an overcoat layer 129, the opposite electrode 111, the alignment layer 110, etc. are formed. In addition, there is a case in which the opposite electrode 111 is arranged over the TFT array substrate 103.

Moreover, the polarization plate 112 is affixed to the outer surfaces of the TFT array substrate 103 and the opposite substrate 104 respectively.

The gate driver IC 113 and the source driver IC 114 are provided in the peripheral area 116 of the TFT array substrate 103. The gate line 108 extends from the display area 115 to the peripheral area 116. Then, the gate line 108 is connected to the gate driver IC 113, at the end portion of the TFT array substrate 103. Similarly, the source line 109 extends from the display area 115 to the peripheral area 116. The source line 109 is connected to the source driver IC 114, at the end portion of the TFT array substrate 103. External wirings 119 and 120 are respectively connected in the vicinity of the gate driver IC 113 and the source driver IC 114. The external wirings 119 and 120 are wiring substrates, such as an FPC (Flexible Printed Circuit).

Various signals are supplied to the gate driver IC 113 and the source driver IC 114 from the outside through the external wirings 119 and 120. The gate driver IC 113 supplies a gate signal (scanning signal) to the gate line 118 based on the control signal from the outside. According to this gate signal, the gate line 108 is selected one by one. The source driver IC 114 supplies a display signal to the source line 109 based on the control signal or the display data from the outside, thereby supplying a display voltage corresponding to the display data to each pixel electrode 117.

Now, the driving method of the liquid crystal display apparatus 100 described above will be explained. A scanning signal is supplied to each gate line 108 from the gate driver IC 113. Based on each scanning signal, all the TFTs 118 connected to one gate line 108 are turned on at the same time. Then, a display signal is supplied to each source line 109 from the source driver IC 114, thereby accumulating electric charge corresponding to the display signal, in the pixel electrode 117. Depending upon the potential difference between the pixel electrode 117 where the display signal has been written and the opposite electrode 111, the alignment of liquid crystal between the pixel electrode 117 and the opposite electrode 111 varies. Thus, the transmission amount of light transmitting the liquid crystal display panel 101 changes. By changing a display voltage for each pixel 117, the molecular alignment of the liquid crystal 106 can be varied, thereby displaying a desired image.

Figure 3:
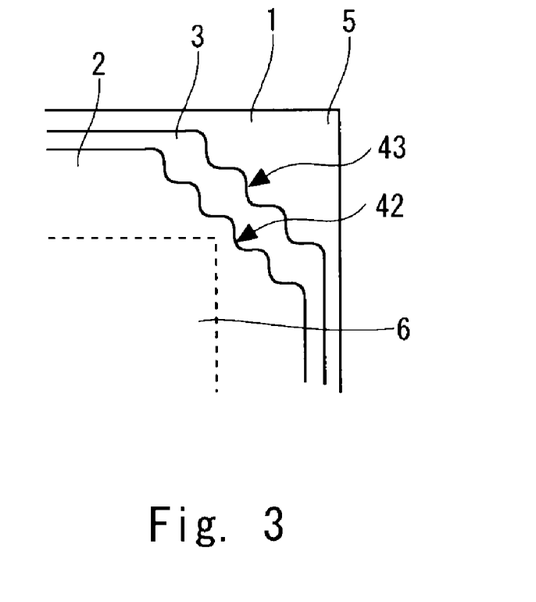
FIG. 3 is a schematic plan view showing the structure of a substrate for the liquid crystal display apparatus according to the first embodiment.

With reference to FIG. 3, the shape of the perimeter of each film layer formed over the TFT array substrate 103 and the opposite substrate 104, and the steps of applying a film layer over these substrates by a spin coat method will be explained in detail. FIG. 3 is a top plan view of the substrate surface of a substrate 1 where film patterns 2 and 3 are formed. FIG. 3 also shows the vicinity of a corner 5 of the rectangular substrate 1. The substrate 1 of FIG. 3 does not show the completion where all the film layers required for the TFT array substrate 103 or the opposite substrate 104 are formed. That is, FIG. 3 is a conceptual diagram illustrating only a part of all the film layers needed, showing the middle of the manufacturing process.

In FIG. 3, the film pattern 3 is formed over the substrate 1, and located between the substrate 1 and the film pattern 2. The film pattern 2 is formed over the film pattern 3. The film patterns 2 and 3 are formed so that they may cover a rectangular area 6 being the display area 115 of the substrate 1. The film patterns 2 and 3 are formed to extend to the outside of the area 6. Specifically, when viewed from the center of the substrate 1, the perimeters of the film patterns 2 and 3 are located outside of the area 6 and inside the corner 5 of the substrate 1, over which the sealing material 105 is to be provided. Furthermore, in the vicinity of the corner 5 of the substrate 1, that is the area between the corner part of the rectangular area 6 and the corner 5, the film patterns 2 and 3 have the shape of a smooth curve. More concretely, the film patterns 2 and 3 have perimeters 42 and 43 having the shape in which of a plurality of circular arcs or elliptic arcs smoothly continue, in the vicinity of the corner 5. Furthermore, although not illustrated in FIG. 3, an organic film layer is formed by spin coating over the film patterns 2 and 3 that have the perimeters 42 and 43 in the shape described above.

With respect to the film patterns 2 and 3 mentioned above, when they are photosensitive organic films, it is possible to form them by performing, for example, a series of steps of prebaking, exposing, developing, and postbaking after applying a photosensitive organic film. When the film patterns 2 and 3 are metal films or insulating films, it is possible to form them, after their having been formed as films, by performing a series of steps of applying resist, prebaking, exposing, developing, etching, and removing resist.

As mentioned above, in the liquid crystal display apparatus disclosed in Japanese Patent Application Laid-open No. 2002-350820, there are a large number of projections 9 each having a right-angled outer edge under a film layer applied by spin coating. Consequently, the flow of the solution of the organic film is prevented by the corner angle of projection 9. Therefore, a problem arises in that a large number of coating unevenness 10, where the thickness of the planarization material is not uniform, are generated at the opposite side with respect to the substrate center direction 11. On the other hand, according to the present embodiment, each of the perimeters 42 and 43 of the film patterns 2 and 3, which serve as the underlying material of the organic film layer to be formed by spin-coating, has the shape of a smooth curve with no crooked angle. Owing to this, it is possible to suppress the flow of the solution of the organic film at the time of spin coating from being remarkably prevented by the shape of the perimeters of the film patterns 2 and 3 serving as the underlying material. Therefore, generation of coating unevenness is suppressed, and then the thickness of the organic film layer formed by spin coating can be uniformed. Furthermore, the display quality of the liquid crystal display apparatus 100 can be improved. Moreover, according to the present embodiment, each of the perimeters 42 and 43 has a waveform shape in which a plurality of circular arcs or elliptic arcs continue smoothly. For this reason, the flow of the solution of the organic film at the time of spin coating is dispersed in various directions at each wave portion. Therefore, the uniformity of organic film distribution can be further improved.

In the case of the substrate 1 of FIG. 3 being the TFT array substrate 103 stated above, the organic film layer to be coated last by spin coating, for example, is formation resist of the pixel electrode 117 serving as a reflective electrode. Then, the film pattern 2 or 3 located under the formation resist is an organic film layer (for example, the insulating film 126) serving as an underlying material of the pixel electrode 117. Moreover, the organic film to be coated last by spin coating may be formation resist of the pixel electrode 117 serving as a transmission electrode made of ITO. Thus, when the film layer applied over the film patterns 2 and 3 by spin coating is resist, the film layer applied by the spin coating is removed in the manufacturing process of the liquid crystal display panel 101. That is, this film layer does not exist in the liquid crystal display apparatus 100 after completion.

On the other hand, in the case of the substrate 1 of FIG. 3 being the opposite substrate 104 stated above, the organic film to be coated last by spin coating, for example, is a pillar-shaped spacer 107. Then, the film pattern 2 or 3 located under the pillar-shaped spacer is the overcoat layer 129. Moreover, the organic film to be coated last by spin coating may be the overcoat layer 129. In this case, the film pattern 2 or 3 located under the overcoat layer is a colored layer of one of three colors RGB of the color filter 127.

The locations of the perimeters 42 and 43 of the film patterns 2 and 3 formed over the substrate 1, that is the TFT substrate 103 and the opposite substrate 104, should be outside of the area 6 being a display area and inside the substrate 1. Then, whichever of the film patterns 2 and 3 may extend more outward than the other when viewed from the area 6. Moreover, the shapes of the perimeters 42 and 43 of the film patterns 2 and 3 may be different each other. Moreover, it should be understood that the number of film layers located under the organic film layer which is spin coated is not restricted to the two layers of the film patterns 2 and 3, and should just be at least one layer.

Moreover, it is not necessarily required to form the shape of the perimeters 42 and 43 of the film patterns 2 and 3 into a waveform at the vicinity of all the corners 5 included in the substrate 1. For example, at the vicinity of the corner 5 which does not affect the uniformity of the thickness of the film layer spin coated in the area 6, it is not necessary to form the shape of the perimeters 42 and 43 into a waveform.

Embodiment 2

Figure 4:
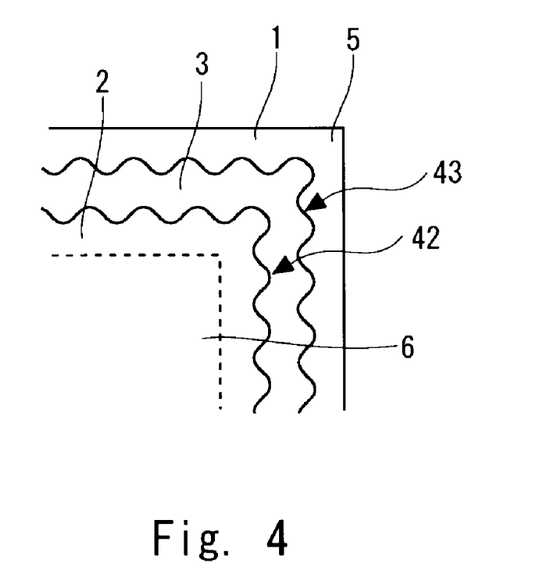
FIG. 4 is a schematic plan view showing the structure of the substrate for the liquid crystal display apparatus according to a second embodiment.

In Embodiment 2, the case of changing the shapes of the perimeters of the film patterns 2 and 3 of Embodiment 1 will be described. FIG. 4 shows a schematic plan view of the substrate 1 according to the present embodiment. As shown in FIG. 4, the film patterns 2 and 3 serving as the underlying material of the organic film layer which is to be spin-coated are formed to have a whole perimeter in the shape of a continuous smooth curve. That is, the shape of four sides on the perimeter of the film patterns 2 and 3 formed to cover the area 6 being a rectangular display area is a continuous smooth waveform. In the vicinity of the corner 5, the adjoining waveform sides of the film patterns 2 and 3 respectively and mutually continue smoothly. Furthermore, although not illustrated in FIG. 4, an organic film layer is formed by spin coating over the film patterns 2 and 3 that have the perimeters in the shape described above.

Owing to this structure, it is possible to suppress the flow of the solution of the organic film at the time of spin coating from being prevented by the shape of the perimeters of the film patterns 2 and 3 serving as the underlying material. Therefore, generation of coating unevenness is suppressed, and then the thickness of the film layer formed by spin coating can be uniformed. Furthermore, the display quality of the liquid crystal display apparatus 100 can be improved. Moreover, according to the present embodiment, the whole perimeters of the film patterns 2 and 3 are in the shape of a waveform. For this reason, the flow of the solution of the organic film at the time of spin coating is dispersed in various directions at each wave portion. Therefore, the uniformity of distribution of the organic film can be further improved. In addition, it is not necessarily required to form the shape of all the four sides of the film patterns 2 and 3 into a waveform. For example, it is acceptable to form the side which does not affect the uniformity of the thickness of the film layer spin coated in the area 6 serving as the display area into a straight line.

The corresponding relation between the substrate 1 of FIG. 4 and the substrates 103 and 104 (TFT substrate 103 and the opposite substrate 104), the forming method of the film patterns 2 and 3, the constraint conditions for the arrangement of the film patterns 2 and 3 and the number of accumulated layers, etc. are the same as those in Embodiment 1 mentioned above. Therefore, detailed description of them is omitted.

Embodiment 3

Figure 5:
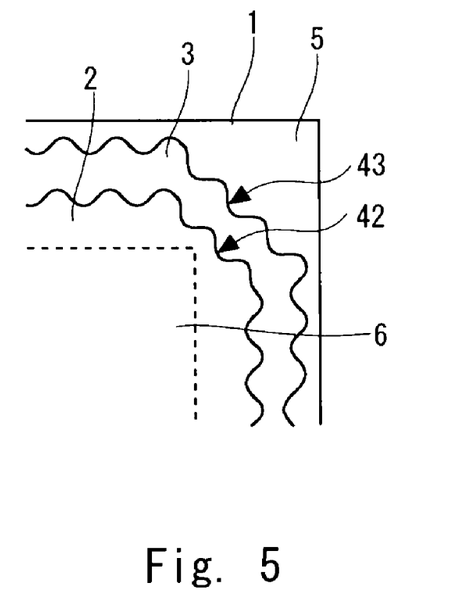
FIG. 5 is a schematic plan view showing the structure of the substrate for the liquid crystal display apparatus according to a third embodiment.

In Embodiment 3, the case of changing the shapes of the perimeters 42 and 43 of the film patterns 2 and 3 of Embodiment 1 will be described. FIG. 5 shows a schematic plan view of the substrate 1 according to the present embodiment. As shown in FIG. 5, the film patterns 2 and 3 serving as the underlying material of the organic film layer to be spin-coated extend to the outside of the area 6 being the display area. Furthermore, in the vicinity of the corner 5, each of the perimeters 42 and 43 of the film patterns 2 and 3, whose corner is cut, has a waveform shape in which a plurality of circular arcs smoothly continue like the stairs as well as Embodiment 1 shown in FIG. 3. Furthermore, the four sides of each of the film patterns 2 and 3 have a waveform shape continuing smoothly, while those in Embodiment 1 have the shape of a straight line. Furthermore, although not illustrated in FIG. 5, an organic film is formed by spin coating over the film patterns 2 and 3 that have the perimeters 42 and 43 in the shape described above.

Owing to this structure, it is possible to suppress the flow of the solution of the organic film at the time of spin coating from being prevented by the shapes of the perimeters 42 and 43 of the film patterns 2 and 3 serving as the underlying material. Therefore, generation of coating unevenness is suppressed, and then the thickness of the film layer formed by spin coating can be uniformed. Furthermore, the display quality of the liquid crystal display apparatus 100 can be improved. Moreover, according to the present embodiment, the whole perimeters of the film patterns 2 and 3 are in the shape of a waveform. For this reason, the flow of the solution of the organic film at the time of spin coating is dispersed in various directions at each wave portion. Therefore, the uniformity of distribution of the organic film can be further improved. In addition, it is not necessarily required to form the shape of the whole perimeters of the film patterns 2 and 3 into a waveform. For example, it is acceptable to from the side which does not affect the uniformity of the thickness of the film layer spin coated in the area 6 serving as the display area into a straight line.

The corresponding relation between the substrate 1 of FIG. 5 and the substrates 103 and 104 (TFT substrate 103 and the opposite substrate 104), the forming method of the film patterns 2 and 3, the constraint conditions for the arrangement of the film patterns 2 and 3 and the number of accumulated layers, etc. are the same as those in Embodiment 1 mentioned above. Therefore, detailed description of them is omitted.

Embodiment 4

Figure 6:
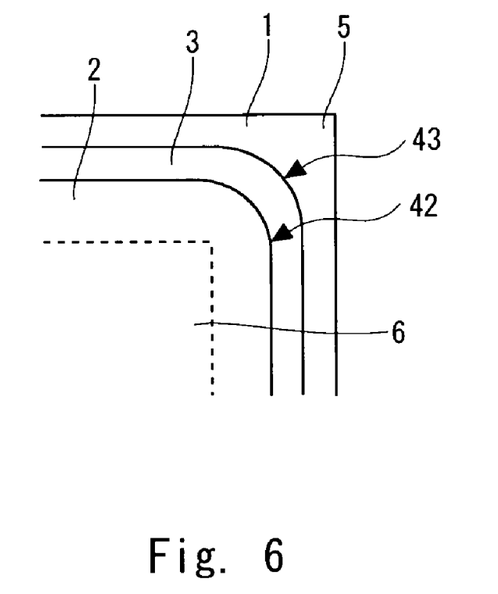
FIG. 6 is a schematic plan view showing the structure of the substrate for the liquid crystal display apparatus according to a fourth embodiment.

In Embodiment 4, the case of changing the shapes of the perimeters of the film patterns 2 and 3 of Embodiment 1 will be described. FIG. 6 shows a schematic plan view of the substrate 1 according to Embodiment 4. As shown in FIG. 6, the film patterns 2 and 3 serving as the underlying material of the organic film layer to be spin-coated extend to the outside of the area 6 being the display area. Furthermore, in the vicinity of the corner 5, each of the perimeters 42 and 43 of the film patterns 2 and 3 has the shape of a smooth rounded curving line. Furthermore, although not illustrated in FIG. 6, an organic film is formed by spin coating over the film patterns 2 and 3 which have the perimeters 42 and 43 in the shape described above.

Even owing to this structure, it is possible to suppress the flow of the solution of the organic film at the time of spin coating from being prevented by the shape of the perimeters 42 and 43 of the film patterns 2 and 3 serving as the underlying material. Therefore, generation of coating unevenness is suppressed, and then the thickness of the film layer formed by spin coating can be uniformed. Furthermore, the display quality of the liquid crystal display apparatus 100 can be improved. In addition, to form the shape of the perimeters 42 and 43 of the film patterns 2 and 3 into a smooth rounded curving line is not necessarily required in the vicinity of all the corners 5 included in the substrate 1. For example, at the vicinity of the corner 5 which does not affect the uniformity of the thickness of the film layer spin coated in the area 6, it is not necessary to form the shape of the perimeters 42 and 43 into a curved line.

The corresponding relation between the substrate 1 of FIG. 6 and the substrates 103 and 104 (TFT substrate 103 and the opposite substrate 104), the forming method of the film patterns 2 and 3, the constraint conditions for the arrangement of the film patterns 2 and 3 and the number of accumulated layers, etc. are the same as those in Embodiment 1 mentioned above. Therefore, detailed description of them is omitted.

In addition, the case of applying the present invention to a liquid crystal display apparatus has been described in Embodiments 1 to 4 described above. However, the present invention is not limited to be applied to the liquid crystal display apparatus. For example, it should be understood that the present invention can also be applied to other display apparatus, such as an electroluminescence display apparatus.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A display apparatus, comprising:
   a substrate including a display area having corner portions and is substantially rectangular; and
   at least one film pattern which is formed over the substrate and extends to an outside of the display area, wherein at least a portion of a perimeter of the at least one film pattern has a waveform shape, the waveform shape being a continuous line of a plurality of arcs extending in each of a first direction and a second direction, such that an end of a first arc, which is arcing in the first direction, is continuously connected to an end of a successive second arc, which is arcing in the second direction opposite that of the first direction of the first arc, the waveform shape being located in a vicinity of at least one of the corner portions of the display area.

2. The display apparatus according to claim 1, wherein the film pattern is formed to cover the display area, and wherein a first side has the waveform shape, the first side being at least one side of four sides on the perimeter of the film pattern, and the first side is formed to continue smoothly with respect to a second side, such that the first side and the second side are continuous in one of the corner portions.

3. The display apparatus according to claim 1, wherein a whole perimeter of the film pattern is formed to have the waveform shape.

4. The display apparatus according to claim 1, wherein the waveform shape extends outside of the display area approximating a substantially rectangular shape of the substrate such that the perimeter of the at least one film pattern extends into the corner portions proximate to a corner edge of the substrate where a sealing material is subsequently applied.

5. The display device according to claim 1, wherein at least two film patterns are formed in layers on single substrate, both of the at least two film patterns having at least a portion of a perimeter that includes the waveform shape.

6. The display apparatus according to claim 1, wherein the display apparatus is a liquid crystal display.

7. The display apparatus according to claim 1, wherein the display apparatus is an electroluminescence display.

8. A display apparatus, comprising:
   a substrate including a display area; and
   at least one film pattern which is formed over the substrate and extends to an outside of the display area, an entire perimeter of the at least one film pattern having a waveform shape, the waveform shape being a continuous line of a plurality of arcs extending in each of a first direction and a second direction, such that an end of a first arc, which is arcing in the first direction, is continuously connected to an end of a successive second arc, which is arcing in the second direction opposite that of the first direction of the first arc.

9. The display device according to claim 8, wherein at least two film patterns are formed in layers on a single substrate, both of the at least two film patterns having an entire perimeter that has the waveform shape.

10. The display apparatus according to claim 8, wherein the display apparatus is a liquid crystal display.

11. The display apparatus according to claim 8, wherein the display apparatus is an electroluminescence display.

12. A method for manufacturing a substrate for a display apparatus, comprising:
   forming a first film pattern over the substrate so that it extends to an outside of a display area of the substrate, wherein a perimeter of the first film pattern has a waveform shape, the waveform shape being a continuous line of a plurality of arcs extending in each of a first direction and a second direction, such that an end of a first arc, that is arcing in the first direction, is continuously connected to an end of a successive second arc that is arcing in the second direction opposite that of the first direction of the first arc, the waveform shape located in a vicinity of at least one of a plurality of corner portions of the display area; and
   coating a second film pattern over the first film pattern by spin coating.

13. The method for manufacturing a substrate for a display apparatus according to claim 12, wherein the film pattern is formed to cover the display area, and wherein a first side has the waveform shape, the first side being at least one side of four sides on the perimeter of the first film pattern, and the first side is formed to continue smoothly with respect to a second side, such that the first side and the second side are continuous in one of the corner portions.

14. The method for manufacturing a substrate for a display apparatus according to claim 12, wherein a whole perimeter of the first film pattern is formed to have the waveform shape.

15. The method for manufacturing a substrate for a display apparatus according to claim 12, wherein the waveform shape extends outside of the display area approximating a substantially rectangular shape of the substrate such that the perimeter of the at least one film pattern extends into the corner portions proximate to a corner edge of the substrate where a sealing material is subsequently applied.

16. The method for manufacturing a substrate for a display apparatus according to claim 12, wherein, when the first film pattern is a photosensitive organic film, forming the first film pattern having the perimeter of a waveform shape on the substrate includes:
   applying a photosensitive organic film,
   prebaking the photosensitive organic film,
   exposing the photosensitive organic film,
   developing the photosensitive organic film, and
   postbaking the photosensitive organic film.

17. The method for manufacturing a substrate for a display apparatus according to claim 12, wherein when the first film pattern is one of a metal and insulating film, forming the first film pattern having the perimeter of a waveform shape on the substrate includes:
   applying resist,
   prebaking one of the metal and insulating film,
   exposing one of the metal and insulating film,
   developing one of the metal and insulating film,
   etching one of the metal and insulating film, and
   removing resist.

18. The method for manufacturing a substrate for a display apparatus according to claim 12, further comprising:
   forming a third film pattern between the first and second film patterns, a perimeter of the third film pattern having the waveform shape, wherein forming the third film pattern includes:
   applying a photosensitive organic film,
   prebaking the photosensitive organic film,
   exposing the photosensitive organic film,
   developing the photosensitive organic film, and
   postbaking the photosensitive organic film.

* * * * *